United States Patent [19]
Geren et al.

[11] 3,836,951
[45] Sept. 17, 1974

[54] HETERODYNE AUTOCORRELATION GUIDANCE SYSTEM

[75] Inventors: Keith E. Geren; Milton D. Papineau; Claude C. Routh, all of San Diego, Calif.

[73] Assignee: The United States of America as represented by the Secretary of the Navy, Washington, D.C.

[22] Filed: May 5, 1960

[21] Appl. No.: 20,225

[52] U.S. Cl. .................................. 340/6 R, 114/23
[51] Int. Cl. .............................................. G01s 3/80
[58] Field of Search ............. 340/6, 16, 3; 343/113, 343/100.7, 16.1, 16; 114/23

[56] References Cited
UNITED STATES PATENTS

| | | | |
|---|---|---|---|
| 2,631,279 | 3/1953 | Bollinger et al. ..................... | 343/16 |
| 2,914,762 | 11/1959 | Gross et al. ............................ | 343/5 |
| 2,929,059 | 3/1960 | Parker .................................. | 343/16 |
| 2,948,892 | 8/1960 | White .................................. | 343/113 |

*Primary Examiner*—Richard A. Farley
*Attorney, Agent, or Firm*—R. S. Sciascia; G. J. Rubens; T. M. Phillips

EXEMPLARY CLAIM

1. In a guidance system adapted to sense incoming energy and ascertain the direction thereof comprising in combination a first means for receiving incoming radiant energy and producing a first electrical output signal proportional thereto, a second means for receiving incoming radiant energy and producing a second electrical output signal proportional thereto, means coupled to said first and second receiving means for accepting the electrical output signals therefrom and transforming same into a sum signal representing the addition thereof and a difference signal representing the subtraction thereof, means connected to said transforming means for receiving said sum signal and said difference signal and for converting same into a pair of electrical signals having identical fixed frequencies and a phase relationship in accordance with the relative left and right direction of said incoming energy, means connected to said sum and difference signal converting means for comparing the phase relationship between said identical fixed frequency signals and producing an output signal in accordance therewith, and readout means coupled to said relative phase comparing means for indicating said relative phase relationship in terms of said relative left and right direction of said incoming energy.

15 Claims, 1 Drawing Figure

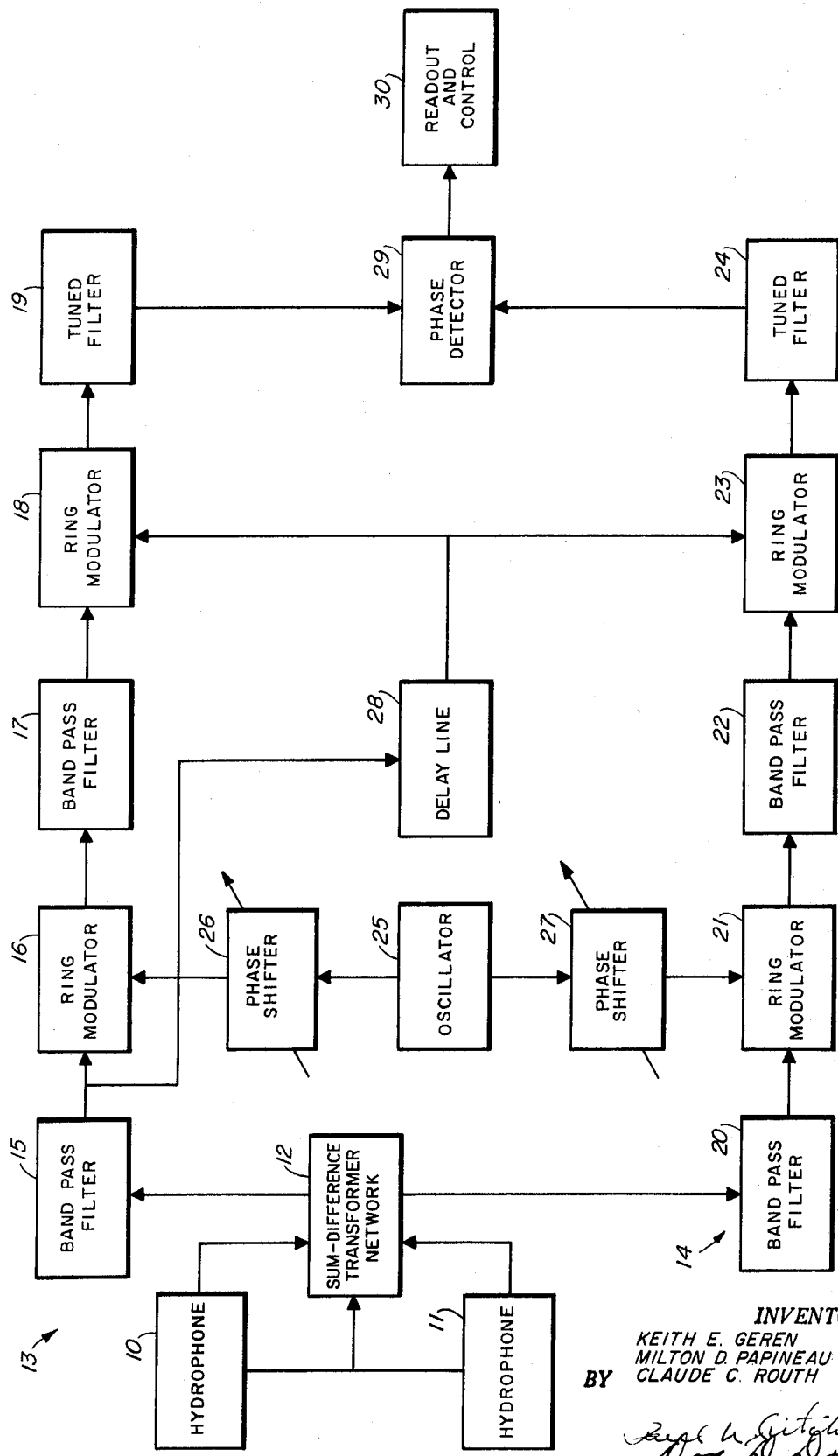

HETERODYNE AUTOCORRELATION GUIDANCE SYSTEM

The invention described herein may be manufactured and used by or for the Government of the United States of America for governmental purposes without the payment of any royalties thereon or therefor.

This invention relates generally to methods and means for determining the direction of a sonic energy source and automatically effecting control of a carrier vehicle in accordance therewith, and, in particular, relates to a twin heterodyne autocorrelation sonar guidance system for long range homing torpedoes and other submarine conveyances and apparatus.

Many of the guidance systems of the prior art employ either amplitude or phase comparison means for indicating the relative direction of a signal source. Although satisfactory for many purposes, these systems have the inherent disadvantage of requiring the input frequency band to be limited to a narrow range of frequencies in order to obtain an acceptable signal-to-noise ratio. Consequently, if the sonic signal is emanating from an enemy vessel or target, it may not be readily discovered because it is unlikely that prior knowledge of its operating frequency will be available, thereby necessitating a time consuming search of the entire acoustical frequency spectrum. This, of course, has the additional adverse effect of being limited to a considerable extent in its application.

The present invention incorporates a new concept in guidance technique which results in a wideband homing system having useful processing gains with improved signal-to-noise ratios. It involves a unique combination of phase comparison and heterodyne correlation principles and includes either two separate hydrophones or transducers or a single split hydrophone connected so that an electrical output signal is respectively produced by each hydrophone upon excitation thereof by acoustical energy received from a single source. These signals are, in turn, converted to sum and difference signals by adding the signals from each hydrophone and by subtracting the signal of one hydrophone from that of the other, respectively. The phase of the sum signal is independent of the direction from which the acoustical energy arrives. Therefore, the sum signal is used herein as the reference or datum signal.

The phase of the difference signal depends on the arrival time and consequently the arrival direction of acoustical energy from some given source and the manipulation of the resulting hydrophone output signals within a sum-difference network. If this source happens to be located at a position that is equidistant from both hydrophones, the acoustical signal arrives at both hydrophones simultaneously, the resulting electrical output signals therefrom will be in phase, a nodal point occurs, and no difference signal is produced. But, in event the acoustical energy source happens to be disposed at any given instant at a location that is closer to one hydrophone than to the other, the acoustical signal arrives thereat at different times, producing a pair of out-of-phase electrical signals which may be transformed into a difference signal having a ninety degree leading or lagging phase with respect to the aforementioned sum signal, depending on whether the acoustical energy source is effectively to the left or right of the hydrophone array. In other words, for example, if the acoustical energy source is located to the left of a plane bisecting a straight line interconnecting the hydrophones, the difference signal will lead the sum signal by 90°, but if it is located to the right of said plane, the difference signal will lag the sum signal by 90°.

In practice, it has been found desirable to make the center-to-center spacing of the receiving hydrophone elements less than one-half wavelength at the highest frequency intended to be received, in order to prevent the sum signal from inverting in phase at certain critical heating angles. This sum signal may be further processed by being heterodyne autocorrelated to obtain a first output signal at a fixed frequency that is independent of the input frequency which produced it. A second heterodyne autocorrelator is used to correlate the difference signal with the sum signal, producing a second fixed frequency output at the same frequency as said first output signal mentioned above.

Phase stability problems are minimized in this invention by using a single delay line that is common to both correlators and a single local oscillator in conjunction with phase shifting means to generate the appropriate heterodyning signals in the two correlator channels. In addition, in applications where it is desired to utilize the correlated outputs at other than the frequency of the local oscillator, an additional mixer and local oscillator may be employed to heterodyne the correlated output to any desired frequency without deviating from the scope and spirit of this invention. Also, it should, likewise, be understood as being included in the teaching of this invention that any desired number of hydrophones and corresponding correlator channels and associated elements may be used to provide desired operational characteristics, and, in event that additional difference signal channels are chosen for simultaneously indicating different angular directions, they each may be similarly combined so as to be referenced by the output of one or more sum signal channels.

Guidance information is obtained by comparing the phase of the two fixed frequency output signals from the sum and difference signal channels, and it may be used in conjunction with appropriate servo-circuits and other control apparatus to provide attitude and direction adjustment of any given carrier vehicle to facilitate navigation thereof or homing on a predetermined type of sound source target.

It is, therefore, an object of this invention to provide a homing guidance system having broadband input characteristics.

Another object of this invention is to provide an acoustical homing guidance system having improved signal-to-noise ratios.

A further object of this invention is to provide a guidance system having improved target sensing abilities.

Another object of this invention is to provide an improved means for navigating a carrier vehicle.

Another object of this invention is to provide an improved means for determining the direction of incoming energy radiation.

A further object of this invention is to provide a new and unique process concept in guidance technique which results in improved processing gains.

A further object of this invention is to provide an improved navigation instrument embodying a unique combination of phase comparison and heterodyne autocorrelation principles.

Another object of this invention is to define an improved navigation instrument for finding and indicating the direction of incoming energy emanating from a single source.

Another object of this invention is to provide an improved passive sonar system for sensing a sonic source target and indicating the relative direction thereof.

Still another object of this invention is to define an improved sonar system for finding a target emanating acoustical energy within a predetermined broadband spectrum and producing vehicle guidance signals in accordance with the left or right relative bearing thereof.

A further object of this invention is to provide a new and improved process for locating a single sound source.

Another object of this invention is to provide a sonar guidance system that is easily and economically constructed and maintained.

Other objects and many of the attendant advantages of this invention will be readily appreciated as the same becomes better understood by reference to the following detailed description when considered in conjunction with the accompanying drawing wherein:

The single FIGURE is a block diagram of the twin heterodyne auto-correlation guidance system constituting a preferred embodiment of this invention.

Referring now to the drawing, there is shown a twin heterodyne autocorrelation guidance system having a pair of hydrophones or transducers 10 and 11 with their electrical outputs coupled to a sum-difference transformer network 12 of the balanced transformer and resistance network type or the like. Two outputs, one representing sum signals and the other representing difference signals, are respectively applied to a sum channel 13 and a difference channel 14.

Sum channel 13 includes a bandpass filter 15, the output of which is coupled to one of the inputs of a ring modulators 16 having its output connected to another bandpass filter 17. Band-pass filter 17, in turn, has its output applied to one of the inputs of another ring modulator 18, the output of which is coupled to a tuned filter 19.

Difference channel 14 may be substantially identical to sum channel 13 and likewise includes a bandpass filter 20, the output of which is connected to one of the inputs of a ring modulator 21 having its output connected to another bandpass filter 22. Bandpass 22, in turn, has its output applied to one of the inputs of another ring modulator 23, the output of which is coupled to a tuned filter 24.

A local oscillator 25 has its output respectively connected to ring modulator 16 of the sum channel and ring modulator 21 of the difference channel through adjustable phase shifters 26 and 27. One of said phase shifters may be of the course adjustment type and one may be of the fine or vernier adjustment type if so desired. Or, if also desired, one of said phase shifters may be omitted if the circuit characteristics of said oscillator and its appropriately associated autocorrelation channel so warrant.

A delay line 28 receives its input from the output of sum channel bandpass filter 15 and produces a delayed signal output which is applied to the other inputs of ring modulators 18 and 23.

The outputs of tuned filters 19 and 24 are fed to a phase detector 29, the output of which is indicated and further employed by appropriate servos and other appropriate vehicle guidance components herein defined as a readout and control 30.

It, of course, should be understood that all of the aforementioned elements are conventional per se and the subject invention lies in their unique arrangement, resulting in a system combination that produces improved guidance results. Moreover, it should be obvious to the artisan that pertinent amplifiers may be incorporated in the subject system as necessary to provide useful signal levels without deviating from the scope and spirit of the inventive concept disclosed herein.

Briefly, the subject invention operates as follows:

Acoustical energy radiated from a target either as an original source or as a reflector source is received by the two hydrophones where it is converted into proportional electrical signals capable of being processed further. These two signals are then applied to the sum-difference transformer network where they are manipulated to produce a sum signal representing the addition of the two electrical output signals from the hydrophones and a difference signal representing that which is obtained by subtracting the electrical output signal of one hydrophone from the electrical output signal of the other hydrophone.

The 90° leading or lagging phase of the difference signal with respect to the sum signal is indicative of the direction of the sound source with respect to the nodal point that would be obtained if the acoustical energy were received simultaneously by both hydrophones which, of course, would be the effect of no difference signal actually being present. Hence, the polarity of the difference signal will reverse with a change in sound source direction to the right or left of the nodal plane normal to and bisecting a line interconnecting the centers of the two hydrophones.

The sum and difference signals are respectively passed through substantially similar first bandpass filters such as, for example, those that pass 5 to 30 kilocycles per second which establishes the band acceptance of the equipment. In the sum channel the output of the first bandpass filter is then heterodyned in the first ring modulator with the local oscillator which may have an output of the order of 42 kilocycles per second. The sum frequency band is filtered out by the upper side band filter which may pass, for instance, 47 to 72 kilocycles per second and is coupled to one of the inputs of the second ring modulators, where it is further heterodyned with a delayed version of the original signal obtained by means of, for example, a 660 microsecond delay line having a lumped constant LC network interconnecting the output of said first bandpass filter and the other input of said second ring modulator. The output of the second ring modulator is passed through the tuned narrow lower sideband filter centerd, for example, on 42 kilocycles per second, the local oscillator frequency.

In the absence of an input signal, there is no output from the second ring modulators. However, a steady-state sine wave input at any frequency within the acceptance band of the system will produce a steady-state signal at the local oscillator frequency at the output of the second ring modulators. When a ping type signal is supplied at the input, the output signal is a ping centered at the local oscillator frequency and has a ping length equal to the input ping length less the difference in delay time between the two circuits feeding their respective signals to the second ring modulator. In event the input ping is shorter than this relative delay, there is no output. If a multiple of such pings or pulses at difference frequencies is supplied at the input, unrelated signals will heterodyne at the second ring modulator and produce sum and difference frequencies. Signals made up of impulses shorter than the relative delay are incoherent and result in a wide frequency band at the output. For instance, a wide band of noise at the input produces a similar result. To the extent a signal is sustained beyond the relative delay, it is coherent and results in a narrow output frequency band centered at the local oscillator frequency. It is, therefore, possible to use a narrow band tuned filter in the output to accept signals produced by coherent inputs and to exclude most of the output that is produced by noise. Thus, it can be seen that incorporation of the delay line in the sum heterodyne autocorrelator channel produces a considerably improved signal-to-noise ratio, since deletion thereof would cause all input signals including noise signals, to be coherent, which, in turn, would adversely translate a wide band of noise signals in the input to a narrow band of noise signals centered on the frequency of the local oscillator.

As mentioned previously, the difference heterodyne autocorrelator channel is similar to that of the sum heterodyne autocorrelator channel; hence, within practical structural limitation, they function in a substantially identical manner, and in event identical inputs are applied to the two channels, two identical outputs will result. It would appear to also be noteworthy that when the phase of one of the inputs to one of the correlators is inverted, the phase of the output of that correlator will invert. In the sum signal correlator channel, both ring modulator inputs are common and a phase reversal at the input of this channel results in a phase reversal at each input to the second ring modulator, with the overall result that the output phase remains unchanged. In the difference signal correlator channel, the difference signal is correlated with the sum signal because the local oscillator and the delay line are common to both channels. This arrangement permits the phase of the difference channel output signal to invert when the phase of the difference channel input signal inverts. However, since the sum channel signal contains no directional intelligence, it is used as the datum which the difference channel directional intelligence signal is referenced at any given instant, and thus combining the sum and difference heterodyne autocorrelator channels in this manner provides two output signals having the same stable fixed frequency but having a relative leading or lagging phase relationship that is in accordance with the left or right direction of the incoming radiant energy constituting the input signals to the hydrophones.

The relative phase of the outputs of each of the correlation channels is dependent upon the phase of the local oscillator and, as stated in the foregoing, is also somewhat contingent upon the inherent structural characteristics of the various and sundry components of the subject guidance system. Although the local oscillator is effectively common to both channels, provision is made to independently adjust the relative phase of the oscillator signal supplied thereto by means of phase shifters disposed between the output of the local oscillator and the sum and difference channels, respectively. While said phase shifters may be adjusted to provide output signals having a considerable range of relative phase differences, it has been found that shifting the phase of the signal fed to one autocorrelation channel by ninety degrees relative to that fed to the other channel is desirable for ease of correlation in the phase detector, even though it should be understood that so doing is not absolutely necessary for operation of the subject invention.

Each of the fixed frequency but phase related output signals from the sum and difference channels are applied to the phase detector where the phase difference therebetween is measured and continuously resolved in terms of a parameter representing left or right target direction information or left or right navigation intelligence. The output of the phase detector is then fed to the readout and control apparatus where it may be visually indicated and recorded as desired and, in addition, applied to pertinent servo mechanisms for actuating vehicle guidance control devices for homing or other navigational purposes.

Although the preferred embodiment of the present invention is disclosed herein as being a system for guiding underwater carrier vehicles, it should be understood that it is not limited thereto and that it may also be employed in conjunction with and for the guidance of vehicles operable within atmospheric or other appropriate environmental mediums.

Obviously, many modifications and variations of the present invention are possible in the light of the above teachings. It is, therefore, to be understood, that within the scope of the appended claims, the invention may be practiced otherwise than as specifically described.

What is claimed is:

1. In a guidance system adapted to sense incoming energy and ascertain the direction thereof comprising in combination a first means for receiving incoming radiant energy and producing a first electrical output signal proportional thereto, a second means for receiving incoming radiant energy and producing a second electrical output signal proportional thereto, means coupled to said first and second receiving means for accepting the electrical output signals therefrom and transforming same into a sum signal representing the addition thereof and a difference signal representing the subtraction thereof, means connected to said transforming means for receiving said sum signal and said difference signal and for converting same into a pair of electrical signals having identical fixed frequencies and a phase relationship in accordance with the relative left and right direction of said incoming energy, means connected to said sum and difference signal converting means for comparing the phase relationship between said identical fixed frequency signals and producing an output signal in accordance therewith, and readout means coupled to said relative phase comparing means for indicating said relative phase relationship in terms of said relative left and right direction of said incoming energy.

2. A heterodyne autocorrelation guidance system comprising in combination a first hydrophone, a second hydrophone, a sum-difference transformer network connected to the outputs of said hydrophones for producing a sum signal output and a difference signal output, a sum heterodyne correlation channel coupled to said sum-difference transformer network for producing a first output signal at a fixed frequency that is independent of the sum signal input frequency, a difference heterodyne correlation channel coupled to said sum-difference transformer network for producing a second output signal having a frequency identical with said first fixed frequency output signal and independent of the difference signal input frequency, means connected to said sum and difference heterodyne correlation channels for delaying a portion of said sum signal output and feeding same thereto for deletion of random noise signals from the aforesaid first and second fixed frequency output signals, means connected to said sum and difference heterodyne correlation channels for regulating the frequency of the aforesaid first and second fixed frequency output signals therefrom, a phase detector connected to the outputs of said sum and difference heterodyne correlation channels for response to said first and second fixed frequency output signals, and readout and control means coupled to the output of said phase detector.

3. Means for determining the bearing of acoustical energy received from a source comprising in combination a pair of transducers, means connected to the outputs of said transducers for converting same into sum signals and difference signals, first and second bandpass filters connected to said converting means for response to said sum and difference signals respectively, a sum signal channel coupled to the output of said first bandpass filter, a difference signal channel coupled to the output of said second bandpass filter, a local oscillator effectively connected between said sum and difference channels, a delay line interconnecting the output of said first bandpass filter and the aforesaid sum and difference signal channels, means connected to the outputs of said sum and difference signal channels for correlating the relative phase therebetween, and means coupled to the output of said correlating means for indicating and recording the output therefrom in terms of the aforesaid acoustical energy source bearing.

4. The means of claim 3 wherein said pair of transducers include hydrophones adapted to produce electrical signals upon excitation by received acoustical energy while being submerged in an aqueous medium.

5. The means of claim 3 wherein said first and second bandpass filters include means for establishing the band acceptance thereof between five and thirty kilocycles per second.

6. The means of claim 3 wherein said delay line is a lumped constant low-pass LC network with a delay time of 660 microseconds.

7. The means of claim 3 wherein said means connected to the outputs of said sum and difference signal channels for correlating the relative phase therebetween is a phase detector which delivers a signal having a DC voltage component, the polarity and potential of which depends on the relative phase of the input signals.

8. The means of claim 3 wherein said sum and difference signal channels are substantially identical and include a first ring modulator, a bandpass filter connected to the output of said first ring modulator, a second ring modulator coupled to the output of said bandpass filter, and a tuned filter connected to the output of said second ring modulator.

9. The means of claim 8 wherein the bandpass filter connected to the output of said first ring modulator is an upper side band filter having a bandpass of forty-seven to seventy-two kilocycles per second.

10. The means of claim 8 wherein said tuned filter is a lower side band filter having a pass frequency equal to the forty-two kilocycles per second output frequency of said local oscillator.

11. A twin heterodyne autocorrelation guidance system comprising in combination a first transducer, a second transducer spacially disposed from said first transducer, means coupled to the outputs of said first and second transducers for simultaneous producing sum signals and difference signals, a sum correlator channel connected to receive said sum signals, a difference correlator channel connected to receive said difference signals, means connected to said sum and difference correlator channels for heterodyning said sum and difference signals into a pair of output signals having fixed identical frequencies and variable relative phase relationships, means connected to the outputs of said sum and difference channels for measuring the phase difference between said fixed identical frequency signals and producing an output signal proportional thereto, and readout and control means coupled to said phase measuring means for response to the aforesaid proportional signal.

12. A heterodyne autocorrelation passive sonar guidance system adapted for determining the bearing of sonic energy received under water and guiding a carrier vehicle in accordance therewith comprising in combination a pair of hydrophones adapted to convert acoustical energy into proportional electrical signals, means connected to said hydrophones for transforming the electrical signals therefrom into a pair of signals one of which represents the sum thereof and the other of which represents the difference thereof, means for filtering said sum and difference signals to provide outputs within identical predetermined frequency ranges, means for heterodyning said filtered sum and difference signals with a given frequency signal, means connected to said heterodyning means for passing the upper sidebands of said heterodyned sum and difference signals, means for heterodyning said upper sidebands of each of said sum and difference signals with a delayed version of the sum signals from said first mentioned filtering means, means coupled to the outputs of said last mentioned heterodyning means for passing the lower sidebands produced thereby, means interconnecting said last mentioned passing means for correlating said lower sideband and determining the relative phase therebetween, and means coupled to the output of said correlating means for indicating said relative phase relationship and controlling the attitude of said carrier vehicle in accordance with a predetermined navigational path pertinent thereto.

13. A heterodyne autocorrelation navigation system comprising in combination a plurality of transducers, a sum-difference transducer network coupled to said transducers for converting the outputs therefrom to sum and difference signals, a first bandpass filter connected to said sum-difference transformer network for response to said sum signals, a first ring modulator connected to the output of said first bandpass filter, a second bandpass filter connected to the output of said first ring modulator, a second ring modulator coupled to the output of said second bandpass filter, a tuned filter connected to the output of said second ring modulator, a third bandpass filter connected to said sum-difference transformer network for response to the difference signal therefrom, a third ring modulator coupled to the output of said third bandpass filter, a fourth bandpass filter connected to the output of said third ring modulator, a fourth ring modulator coupled to the output said fourth bandpass filter, a second tuned filter connected to the output of said fourth ring modulator, a local oscillator, first and second phase shifters interconnecting said local oscillator and said first and third ring modulators respectively, a delay line connected between the output of said first bandpass filter and said second and fourth ring modulators, a phase detector interconnecting the outputs of said first and second tuned filters, and readout and control means coupled to the output of the aforesaid phase detector.

14. A method of determining and recording the relative left and right bearing of acoustical energy received within an aqueous medium comprising the steps of sensing said acoustical energy at two remotely disposed stations, converting said sensed acoustical energy into a pair of electrical signals, mixing said pair of electrical signals to produce signals representing the sum and difference thereof, filtering said sum and difference signals to predetermined ranges of frequencies respectively, heterodyning said predetermined ranges of frequencies with a given frequency, passing the upper sidebands of said heterodyned frequencies, heterodyning said upper sidebands with delayed sum signals originally obtained from filtering said sum and difference signals to predetermined ranges of frequencies, passing the lower sidebands produced by said last mentioned heterodyning step, correlating said lower sidebands and the relative phase relationship therebetween, and reading out said relative phase relationship in terms of received acoustical energy bearing.

15. A heterodyne autocorrelation guidance system comprising in combination, a pair of transducers each of which is adapted for converting predetermined incoming radiant energy into electrical signals proportional thereto, means coupled to said pair of transducers for transforming said proportional electrical signals into a pair of output signals one of which is the algebraic sum thereof and the other of which is the algebraic difference thereof, means effectively coupled to said transforming means for heterodyning said sum and difference signals with a predetermined oscillating signal, a first filter means coupled to the output of said heterodyning means for passing the upper sideband of said heterodyned sum signals, a second filter means coupled to the output of said heterodyning means for passing the upper sideband of said heterodyned difference signals, means effectively interconnecting said transforming means and said first and second filter means for simultaneously heterodyning said passed sum and difference upper sidebands with a delayed version of the aforesaid unheterodyned algebraic sum signals, filter means coupled to the outputs of said upper sideband heterodyning means for respectively passing the lower sidebands of the sum and different signal outputs therefrom as a pair of signals having a fixed frequency and a variable relative phase relationship, and means effectively connected to the outputs of said lower sideband passing filter means for detecting and reading out the relative phase of said pair of fixed frequency signals in terms of the direction of travel of the aforesaid incoming radiant energy.

* * * * *